US009152183B2

(12) United States Patent
Kurczewski

(10) Patent No.: US 9,152,183 B2
(45) Date of Patent: Oct. 6, 2015

(54) LOCKING MECHANISM FOR HINGE ASSEMBLY

(71) Applicant: Intel Corporation, Santa Clara, CA (US)

(72) Inventor: Nicolas A. Kurczewski, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/834,913

(22) Filed: Mar. 15, 2013

(65) Prior Publication Data

US 2014/0268555 A1    Sep. 18, 2014

(51) Int. Cl.
*E05C 19/00* (2006.01)
*G06F 1/16* (2006.01)

(52) U.S. Cl.
CPC ............ *G06F 1/1681* (2013.01); *G06F 1/1679* (2013.01); *E05Y 2900/606* (2013.01); *G06F 1/1616* (2013.01); *Y10T 16/5401* (2015.01)

(58) Field of Classification Search
CPC ... F16F 9/535; F16F 2224/045; F15B 21/065; F16D 57/002; E05Y 2400/21; E05B 2047/0033; H01F 1/447; A63B 21/0056

USPC .................................. 292/1, DIG. 17, 251.5
See application file for complete search history.

(56) References Cited

U.S. PATENT DOCUMENTS

| 5,492,312 A * | 2/1996 | Carlson ................... 267/140.14 |
| 2010/0162776 A1 * | 7/2010 | Bose et al. ........................ 70/89 |
| 2012/0167704 A1 * | 7/2012 | Lange et al. ............... 74/473.11 |

* cited by examiner

*Primary Examiner* — Mark Williams
(74) *Attorney, Agent, or Firm* — Alpine Technology Law Group LLC

(57) ABSTRACT

In one embodiment a locking mechanism for a hinge, comprises a housing defining a chamber which is to contain a magnetorheological (MR) fluid, a bias mechanism which disposed at a first end of the chamber, a piston disposed at a second end of the chamber, the piston to be coupled to a hinge rotatable about a first axis, wherein rotation of the hinge about the first axis translates the piston laterally in the housing on a first side of the chamber, and a magnet positioned proximate the housing to change the MR fluid from a first state in which the MR fluid exhibits a low viscosity to a second state in which the MR exhibits a high viscosity. Other embodiments may be described.

18 Claims, 11 Drawing Sheets

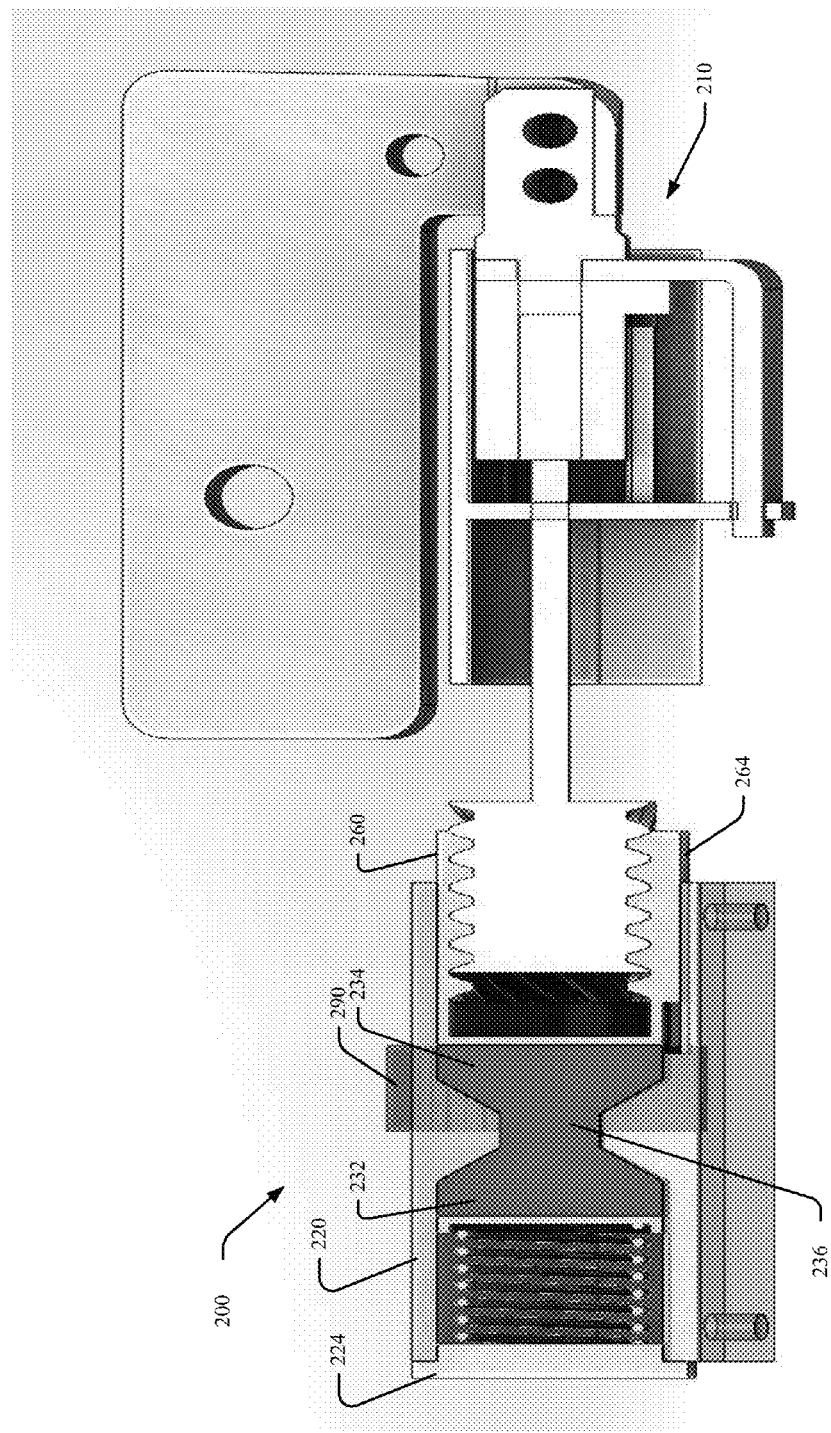

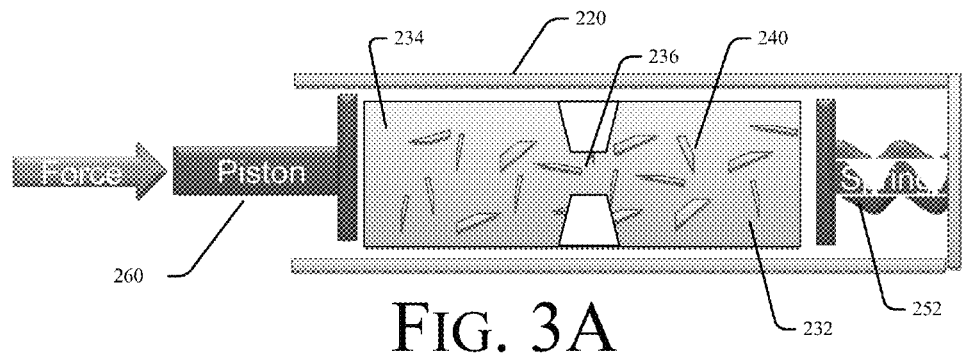
FIG. 3A
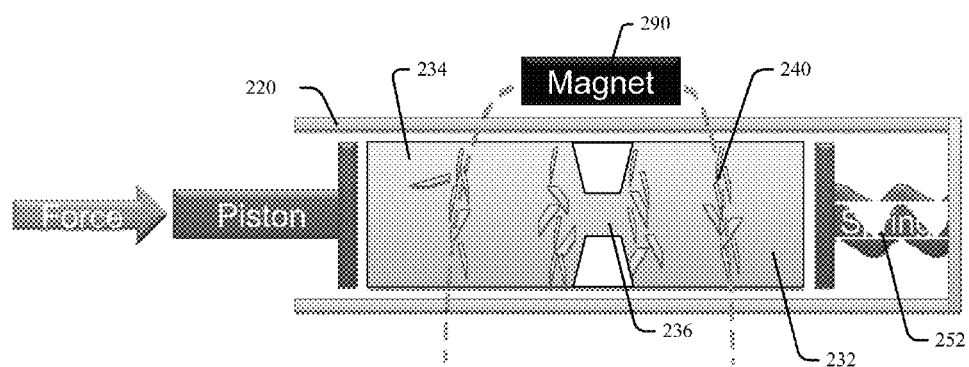
FIG. 3B
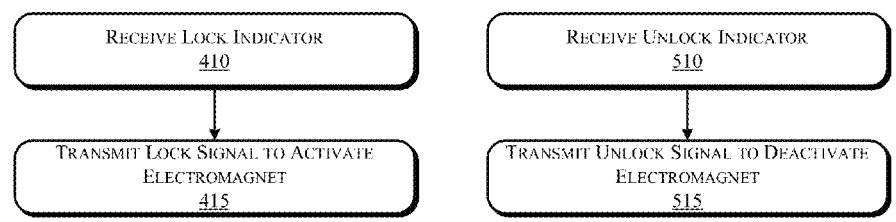
FIG. 4
FIG. 5

LOCKING MECHANISM FOR HINGE ASSEMBLY

BACKGROUND

The subject matter described herein relates generally to the field of electronic devices and more particularly to a locking mechanism for one or more hinge assemblies.

Some electronic devices utilize a notebook chassis. By way of example, many portable computers (e.g. traditional laptop, detachable, or convertible) and mobile electronic devices utilize a notebook chassis in which a keyboard is disposed on a first section and a display is disposed on a second section which is coupled to the first section by a hinge. Alternatively, a "clamshell" style laptop can consist of displays, e.g. at least one display on a first section and possibly one or more displays, that can also be utilized as a touch keyboard, on a second section coupled to the first section by a hinge.

Touch screen user interface is becoming increasingly common with all electronic devices, and most notably with mobile devices. In some instances, touch screen operation may cause the display to rotate due to the force applied to the screen, by the user. Locking assemblies, or at least the ability inhibit the rotation of a display on a notebook chassis may find utility.

BRIEF DESCRIPTION OF THE DRAWINGS

The detailed description references the accompanying figures.

FIGS. 2A-2E, 3A and 3B are schematic illustrations of a hinge assembly in accordance with some embodiments.

FIGS. 4-5 are flowcharts illustrating operations in a method to operate a hinge assembly in accordance with some embodiments.

FIGS. 3A-3B are schematics illustrating portions of a housing for an electronic device incorporating a hinge assembly in accordance with some embodiments.

DETAILED DESCRIPTION

Described herein are exemplary systems and methods to lock, or at least to inhibit the rotation of a hinge, such as may be used for a display on a notebook system chassis. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
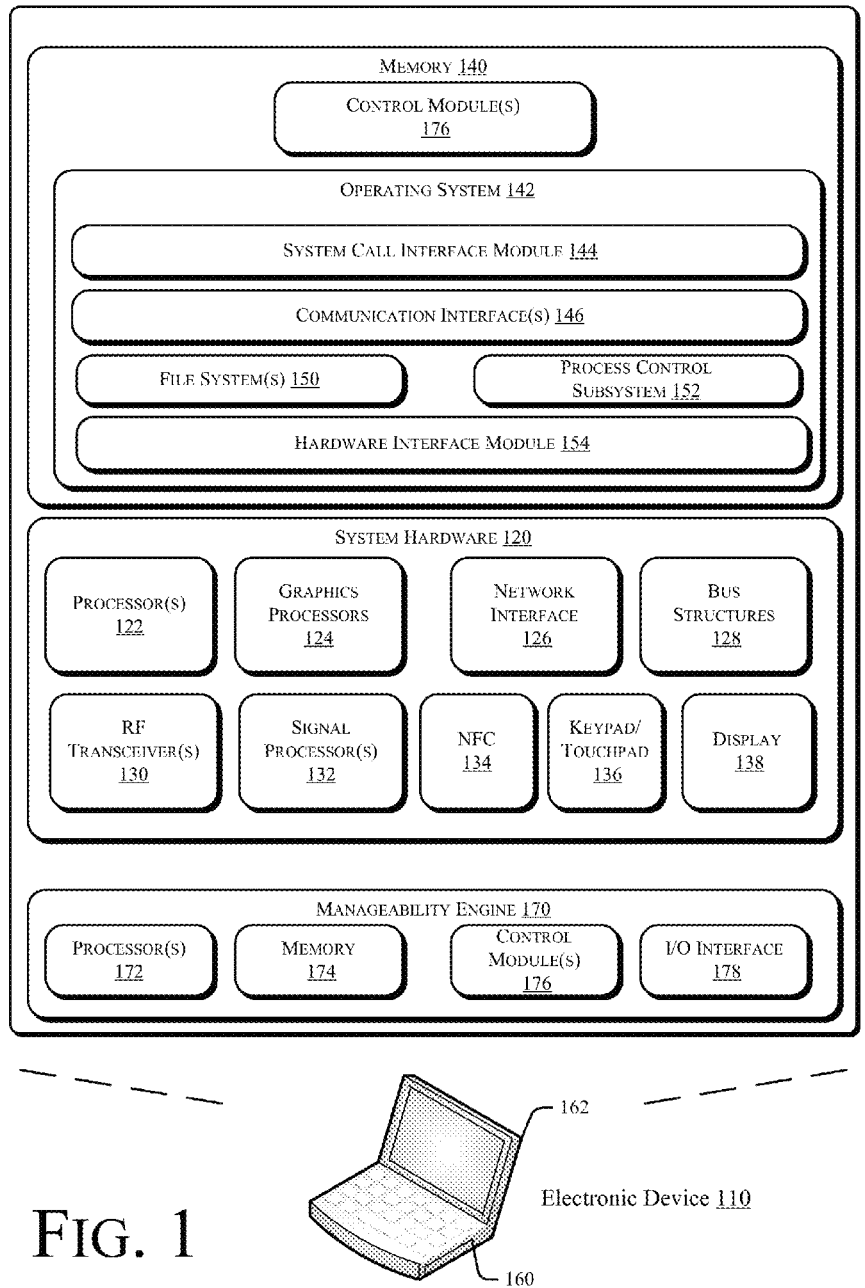
FIG. 1 is a schematic illustration of an exemplary electronic device which may include a hinge assembly in accordance with some embodiments.

FIG. 1 is a schematic illustration of an exemplary electronic device 110 which may be adapted to include systems and methods to lock, or at least to inhibit the rotation of a display on a notebook chassis having a first section 160 and a second section 162 in accordance with some embodiments. As illustrated in FIG. 1, electronic device 110 may be embodied as a conventional portable device such as a laptop computer, a mobile phone, tablet computer portable computer, or personal digital assistant (PDA). The particular device configuration is not critical.

In various embodiments, electronic device 110 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 110 to receive input from a user.

The electronic device 110 includes system hardware 120 and memory 140, which may be implemented as random access memory and/or read-only memory. A file store may be communicatively coupled to computing device 110. The file store may be internal to computing device 110 such as, e.g., eMMC, SSD, one or more hard drives, or other types of storage devices. The file store may also be external to computer 110 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 110 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 110 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11x. IEEE 802.11a, b, g or n-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 110 may further include one or more input/output interfaces such as, e.g., a keypad 136 and a display 138. In some embodiments electronic device 110 may not have a keypad and use the touch panel for input.

Memory 140 may include an operating system 142 for managing operations of computing device 110. In one embodiment, operating system 142 includes a hardware interface module 154 that provides an interface to system hardware 120. In addition, operating system 140 may include a file system 150 that manages files used in the operation of computing device 110 and a process control subsystem 152 that manages processes executing on computing device 110.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some embodiments an electronic device may include a manageability engine 170, which may comprise one or more controllers that are separate from the primary execution environment. The separation may be physical in the sense that the manageability engine may be implemented in controllers which are physically separate from the main processors. Alternatively, the trusted execution environment may logical in the sense that the manageability engine may be hosted on same chip or chipset that hosts the main processors.

By way of example, in some embodiments the manageability engine 170 may be implemented as an independent integrated circuit located on the motherboard of the electronic device 110, e.g., as a dedicated processor block on the same SOC die. In other embodiments the trusted execution engine may be implemented on a portion of the processor(s) 122 that is segregated from the rest of the processor(s) using hardware enforced mechanisms In the embodiment depicted in FIG. 1 the manageability engine 170 comprises a processor 172, a memory module 174, a control module 176, and an I/O interface 178. In some embodiments the memory module 174 may comprise a persistent flash memory module and the various functional modules may be implemented as logic instructions encoded in the persistent memory module, e.g., firmware or software. The I/O interface 178 may comprise a serial I/O module or a parallel I/O module. Because the manageability engine 170 is separate from the main processor(s) 122 and operating system 142, the manageability engine 170 may be made secure, i.e., inaccessible to hackers who typically mount software attacks from the host processor 122.

In some embodiments the electronic device 100 may comprise a hinge assembly which couples the first section 160 and the second section 162. In embodiments in which the second section includes a single display the first position may correspond to the electronic device being in a closed configuration and the second position may correspond to the electronic device being in an open configuration which may be suitable for use as a tablet device.

Embodiments of a locking mechanism for a hinge will be described with reference to FIGS. 2A-2E and 3A-3B. Referring first to FIGS. 2A-2E, an exemplary locking mechanism 200 which may be used to selectively lock a hinge 210 in a notebook chassis of an electronic device comprised of a housing 220 defining a chamber 230 which is to contain a magnetorheological (MR) fluid. A bias mechanism 250 is disposed at a first end of the chamber 230. A piston 260 is disposed at a second end of the chamber 230 and coupled to the hinge 210. A magnet 290 is positioned proximate the housing 220 to change the MR fluid from a first state in which the MR fluid exhibits a low viscosity to a second state in which the MR exhibits a high viscosity, respectively between the two states.

The specific configuration of the hinge assembly 210 is not critical to the operation of the locking assembly. In the embodiments depicted in FIGS. 2A-2E the hinge 210 comprises a base plate 216 and a face plate 218. Base plate 216 may be coupled to the first section 160 of a housing for an electronic device while face plate 218 may be coupled to a second section 162 of the housing.

Housing 220 may comprise a base 222 which may be secured to an underlying structure by suitable fasteners. The body of housing 220 may be substantially cylindrical in shape and may have an outer diameter that measures between about 0.25 inches (6.35 millimeters) in and 1.00 inches (25.40 millimeters). The body of housing 220 may have a length that measures between about 0.50 inches (12.70 millimeters) in and 5.00 inches (127.00 millimeters).

As described above, the housing 220 defines a chamber 230 which is to contain a magnetorheological (MR) fluid. In some embodiments the chamber 230 comprises a first reservoir 232 and a second reservoir 234 connected by a constricted passageway 236. Accordingly, the inner diameter of the housing 220 depicted in FIGS. 2A-2E varies across its length from an inner diameter that measures about 0.08 inches (2 millimeters) in the constricted passageway 236 to an inner diameter that measures about 0.16 inches (4 millimeters) in other locations.

In some embodiments the housing 220 may be formed from a suitably rigid material, e.g., a polymer or a suitable metallic material using conventional machining, molding, or forming techniques.

In some embodiments the bias mechanism 250 comprises a compression spring 252 having a first seal 254 which defines the first end of the chamber 230. The compression spring is retained between the seal 254 and an end cap 224 of housing 220 and biases the first seal 254 in a direction toward the constricted passageway 236. One skilled in the art will recognize that biasing mechanisms other than spring 252 could be used to bias seal 254 in a direction toward the constricted passageway 236. By way of example, compression spring 252 could be replaced with a tension spring positioned in the chamber 230 and secured to seal 254 to bias the seal 254 in a direction toward the constricted passageway 236. Alternatively, a torsion spring could be coupled to seal 254 to bias seal 254 in a direction toward the constricted passageway 236. In further embodiments a compressible gas, or repulsion magnet assembly could be used to bias seal 254 in a direction toward the constricted passageway 236. The specific bias mechanism implemented is not critical to the overall operation of the locking mechanism.

Figure 2A:
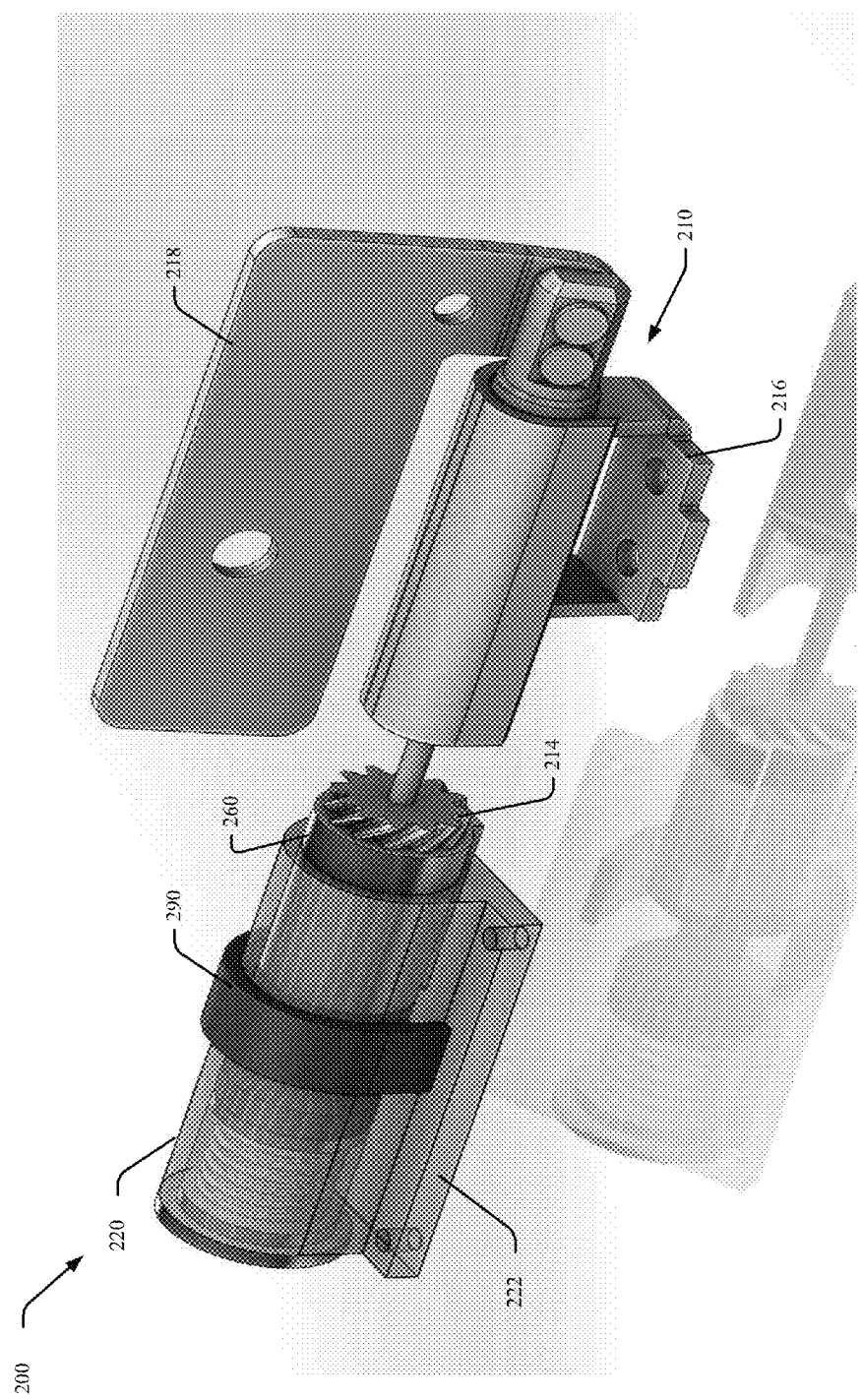
Figure 2B:
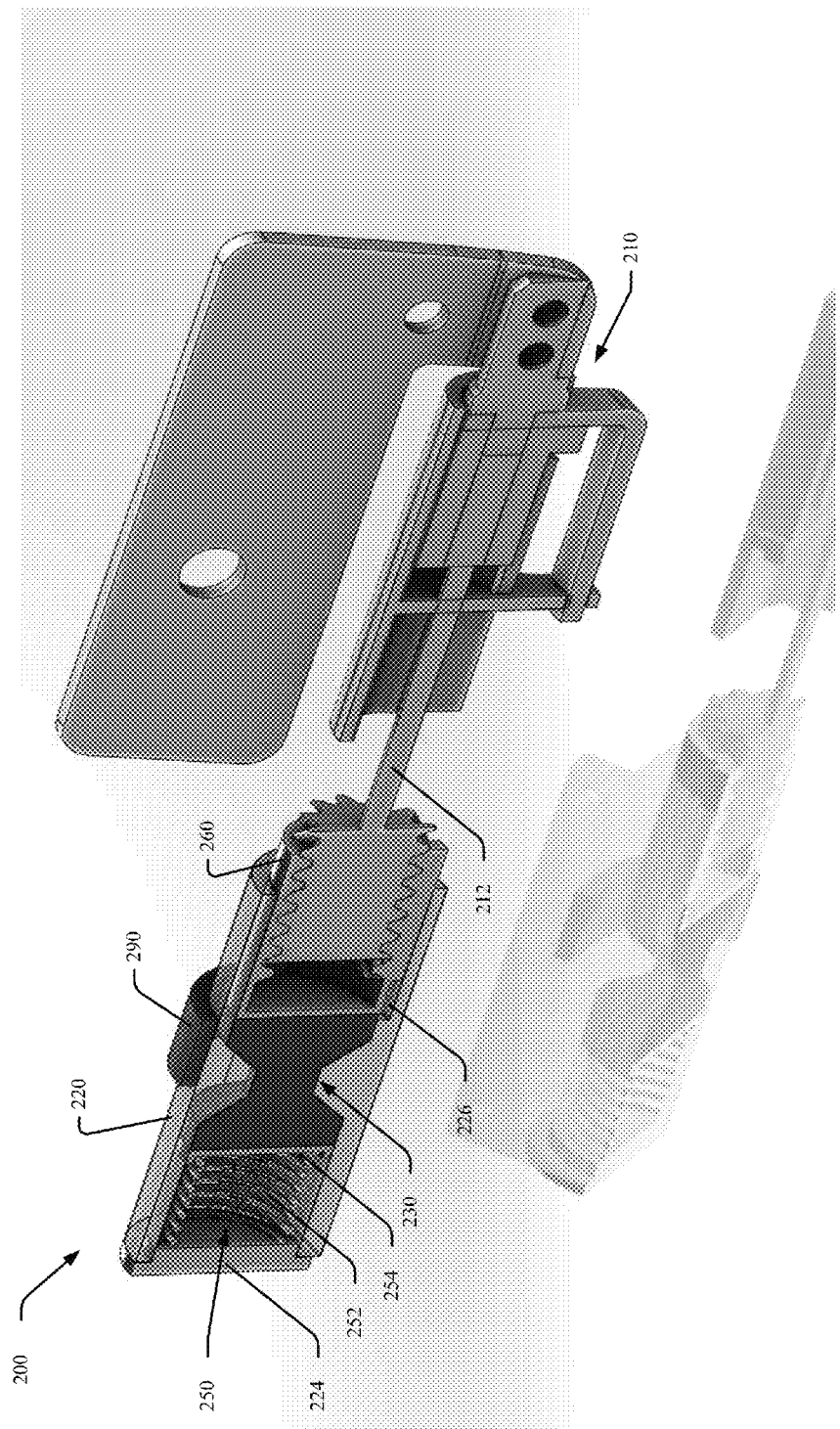
Figure 2D:
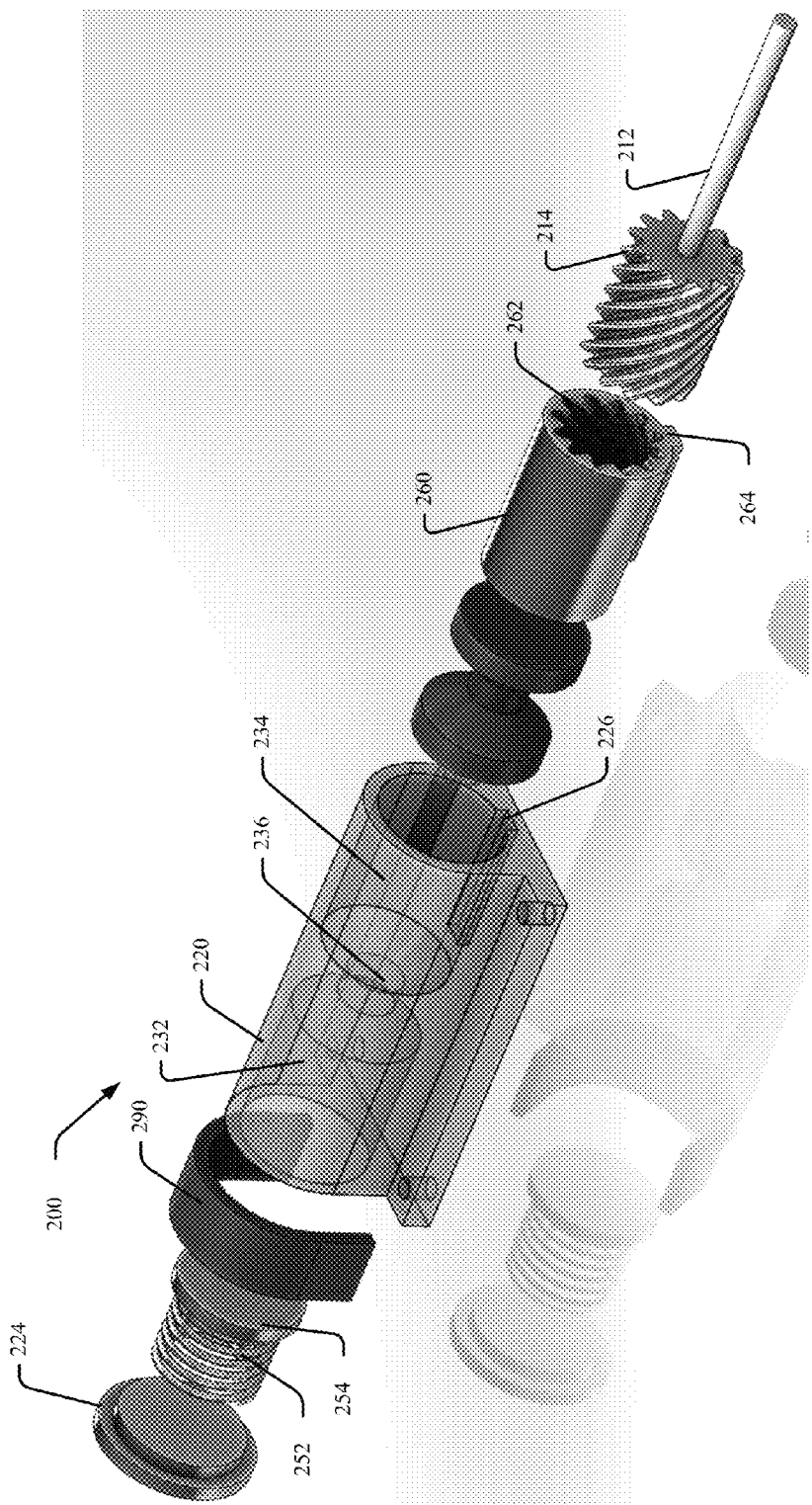
Figure 2E:
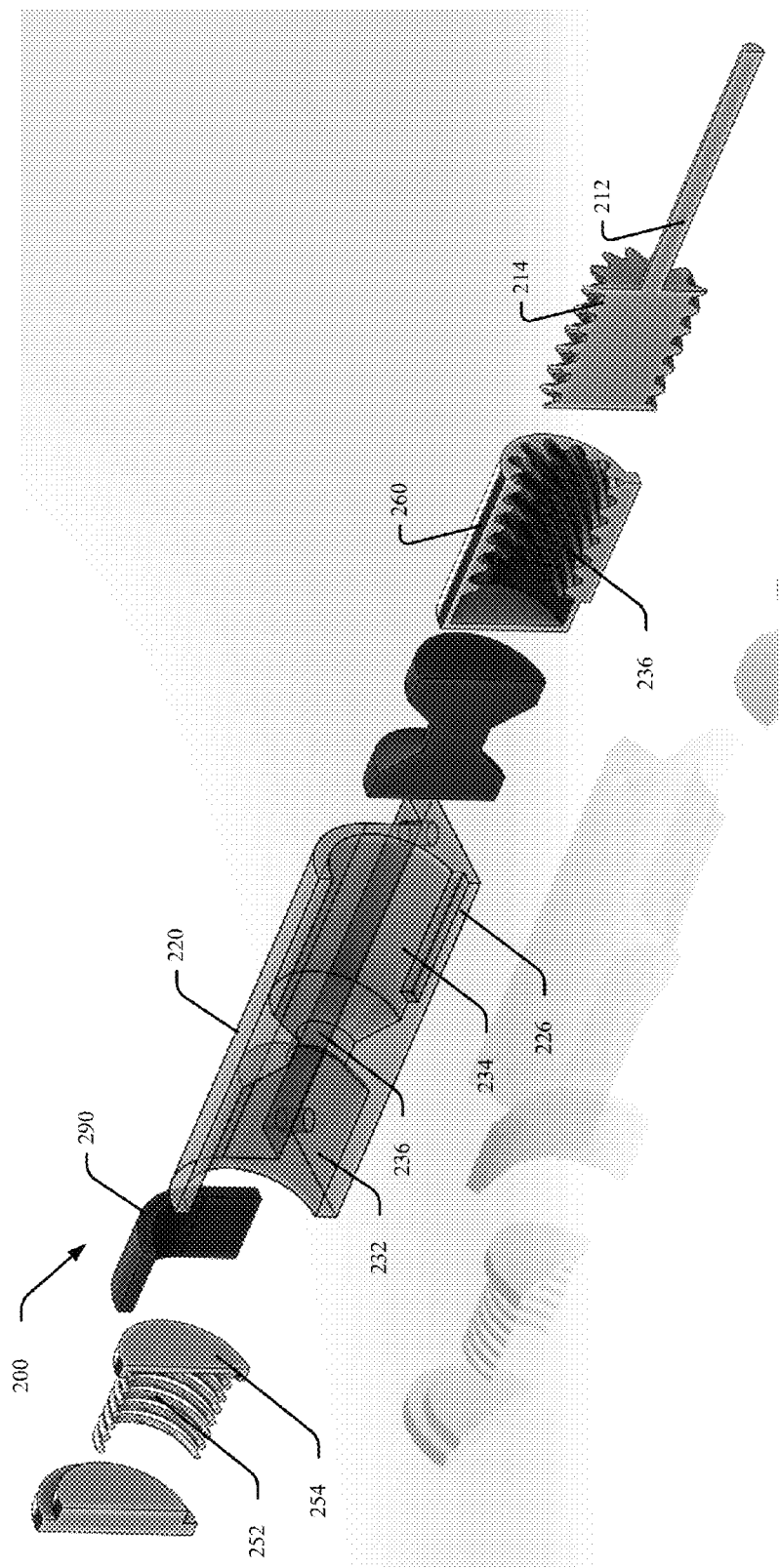

Piston 260 may have an outer diameter that is dimensioned to fit within the housing 220. In the embodiments depicted in FIGS. 2A-2E the piston 260 may comprise a key 264 which slides into a slot 226 in housing 220 (FIG. 2D). Further, piston 260 comprises a threaded interior surface 262 which mates with a threaded exterior surface 214 of a helical screw 212 coupled to the hinge 210.

In some embodiments the magnet 290 comprises a permanent magnet which may be coupled to the housing 210 and movable along the length of the housing between a first position in which the magnet 290 is displaced from the chamber 230 to a second position in which the magnet 290 is proximate the chamber 230. By way of example, the magnet 290 may be movable along the length of the housing 220 between a first position in which the magnet is adjacent the bias mechanism 250 or adjacent the piston 260 to a second position in which the magnet is adjacent the chamber 230, as illustrated in FIGS. 2A-2C. More generally, in alternate embodiments the magnet 290 may be removed from the vicinity of chamber 230, regardless of direction.

In alternate embodiments the magnet 290 comprises an electrically activated magnet which may be positioned permanently proximate the chamber 230, as illustrated in FIGS. 2A-2C. In such embodiments the magnet 290 may receive a signal initiated by a remote controller such as the control module 176 to activate and to deactivate the magnetic field caused by magnet 290.

The locking mechanism 200 may be assembled by sliding the compression spring 200 and seal 254 into the first chamber 232 and fitting the end cap 224 onto the end of the housing 220 and sliding the piston 260 into the second chamber 234. The helical screw 212 may be screwed into the piston 260 before or after the piston 260 is fitted into the chamber 234.

A MR fluid may be introduced into the chamber 230 during the assembly process. In some embodiments the MR fluid may be poured into the chamber 230 through either open end of the housing 220 during the assembly process. In alternate embodiments the housing may comprise an orifice through which MR fluid may be injected into the chamber 230 after assembly. The specific composition of the MR fluid is not critical. In some embodiments a suitable MR fluid may comprise ferrous particulates and a carrier fluid.

In some embodiments a locking mechanism 200 for a hinge assembly as depicted in FIGS. 2A-2E may be incorporated into a housing for an electronic device, such as an electronic device 110 depicted in FIG. 1. As described above, base plate 216 may be coupled to the first section 160 of a chassis for an electronic device while face plate 218 may be coupled to a second section 162 of the chassis. As described above, the first section 160 may correspond to a base of a laptop personal computer and may comprise a keyboard and one or more additional input output devices. Further, the first section may comprise internal components of a computer system, as described above with reference to FIG. 1. Second section 162 may comprise a display and one or more additional input/output devices, e.g., a touch screen, a microphone, a camera, or the like. In some embodiments a chassis for an electronic device may comprise a hinge assembly as depicted in FIGS. 2A-2C such that the first section 160 and the second section are rotatable relative to one another.

Referring to FIG. 3A, when the magnet 290 is not acting on the MR fluid 240 the MR fluid 240 remains in a low viscosity state, respectively, such that the MR fluid 240 flows with relative ease through the constricted passageway 236 between the first chamber 232 and the second chamber 234. Thus, in operation when the hinge 210 is rotated the threaded screw 212 rotates, driving the piston 260 to translate laterally in the mechanism assembly. One skilled in the art will recognize that the direction in which the piston translates is a function of the orientation of the threads on the piston 260 and the threaded screw 212, respectively. In the embodiments depicted in FIGS. 2A-2E the piston 260 and threaded screw 212 are oriented such that opening the hinge 210 drives the piston into the housing 220, which forces MR fluid from the first reservoir 232 through the constricted passageway 236 to the second reservoir 234, which in turn compresses the spring 252. Conversely, closing the hinge 210 retracts the piston 260 from the housing 220 such that the spring 252 forces MR fluid from the second reservoir 232 through the constricted passageway 236 to the first reservoir 232. Thus, when the magnet 290 is not acting on the MR fluid 240 hinge 210 opens and closes with minimal resistance. The direction of piston translation with respect to the hinge rotation is established by the screw thread direction, which is not critical to the function of this locking mechanism.

Referring to FIG. 3B, when the magnet 290 is acting on the MR fluid 240 the MR fluid 240 changes to a high viscosity state such that the MR fluid 240 exhibits a high shear strength and resists flowing through the constricted passageway 236 between the first chamber 232 and the second chamber 234. When the strength of the magnetic field created by the magnet 290 is sufficiently high the shear strength of the MR fluid 240 becomes high enough that the MR fluid 240 cannot flow through the constricted passageway 236, effectively locking the hinge 210 in place.

Thus, when magnet 290 is embodied as a permanent magnet the hinge 210 may be locked by positioning magnet 290 proximate the chamber 230 and may be unlocked by positioning the magnet 290 at a location that is displaced from the chamber 230.

In embodiments in which the magnet 290 is embodied as an electrically actuated magnet the magnet 290 may be communicatively coupled to the control module(s) 176 to receive a signal to activate and/or to deactivate the magnet 290. In some embodiments the control module(s) 176 may comprise logic to receive an input from a user interface, wherein the user input comprises an indicator to lock the hinge assembly. By way of example, referring to FIG. 4 in some embodiments the control module(s) 176 may receive (operation 410) a user input from the keypad 136 or from a user interface presented on the display 138, wherein the user input comprises an indicator to lock the hinge 210. In response to the user input, the control module(s) 176 may generate a lock signal which may be transmitted (operation 415) to the magnet 290 to activate the magnet 290 to lock the hinge 210.

Conversely, referring to FIG. 5 in some embodiments the control module(s) 176 may receive (operation 510) a user input from the keypad 136 or from a user interface presented on the display 138, wherein the user input comprises an indicator to unlock the hinge 210. In response to the user input, the control module(s) 176 may generate an unlock signal which may be transmitted (operation 515) to the magnet 290 to deactivate the magnet 290 to unlock the hinge 210.

Figure 6:
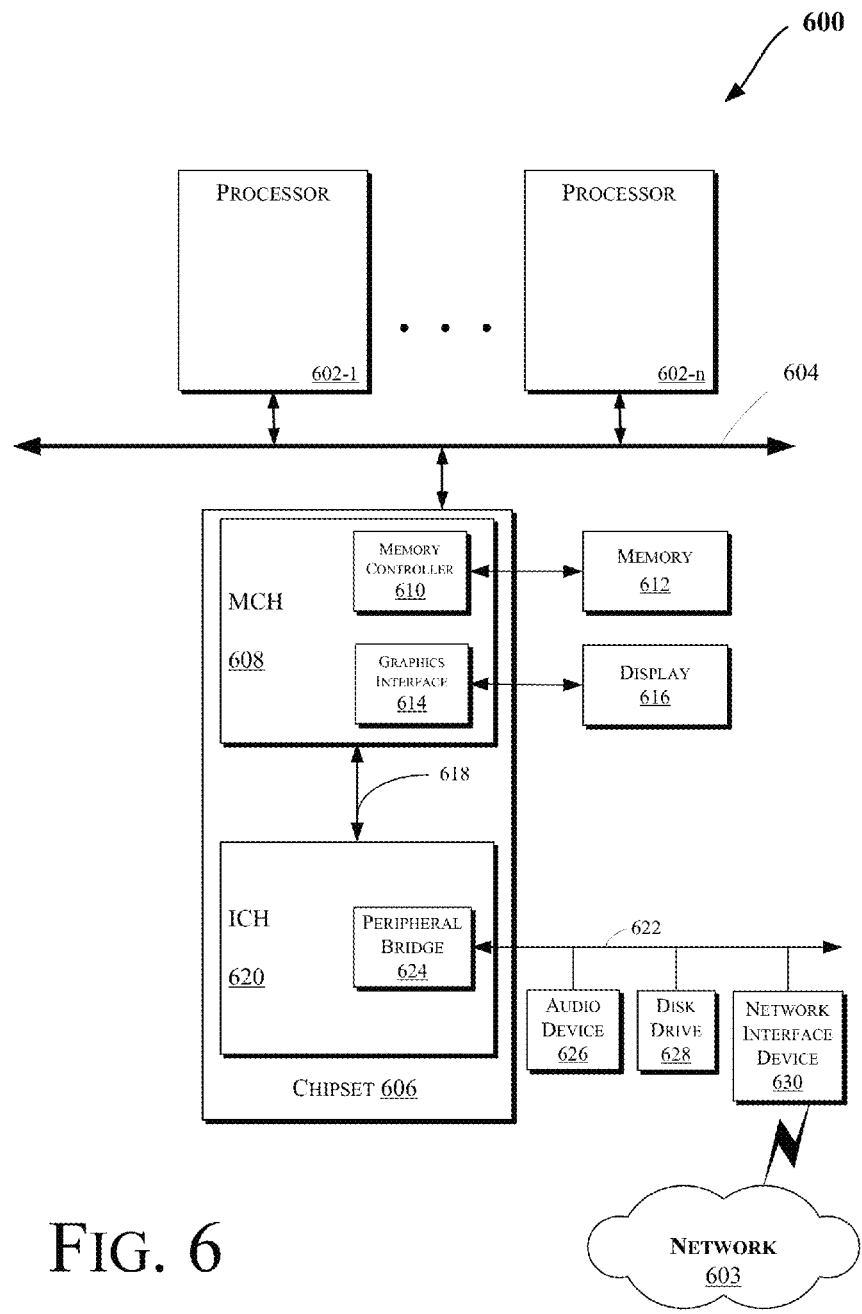
FIGS. 6-9 are schematic illustrations of electronic devices which may be modified to include a hinge assembly in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
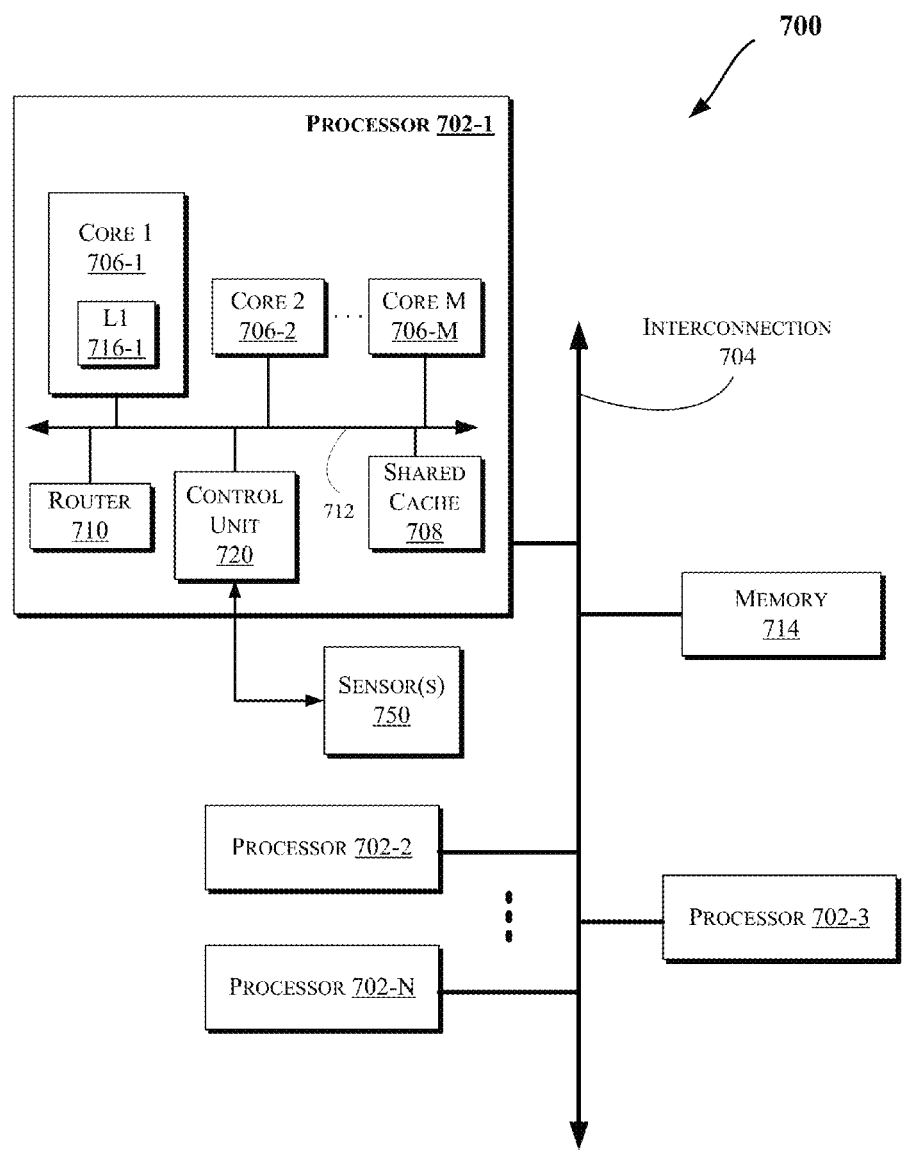

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1

(generally referred to herein as "L1 cache 716"). In one embodiment, the controller 720 may include logic to implement the operations described above with reference to FIG. 3.

Figure 8:
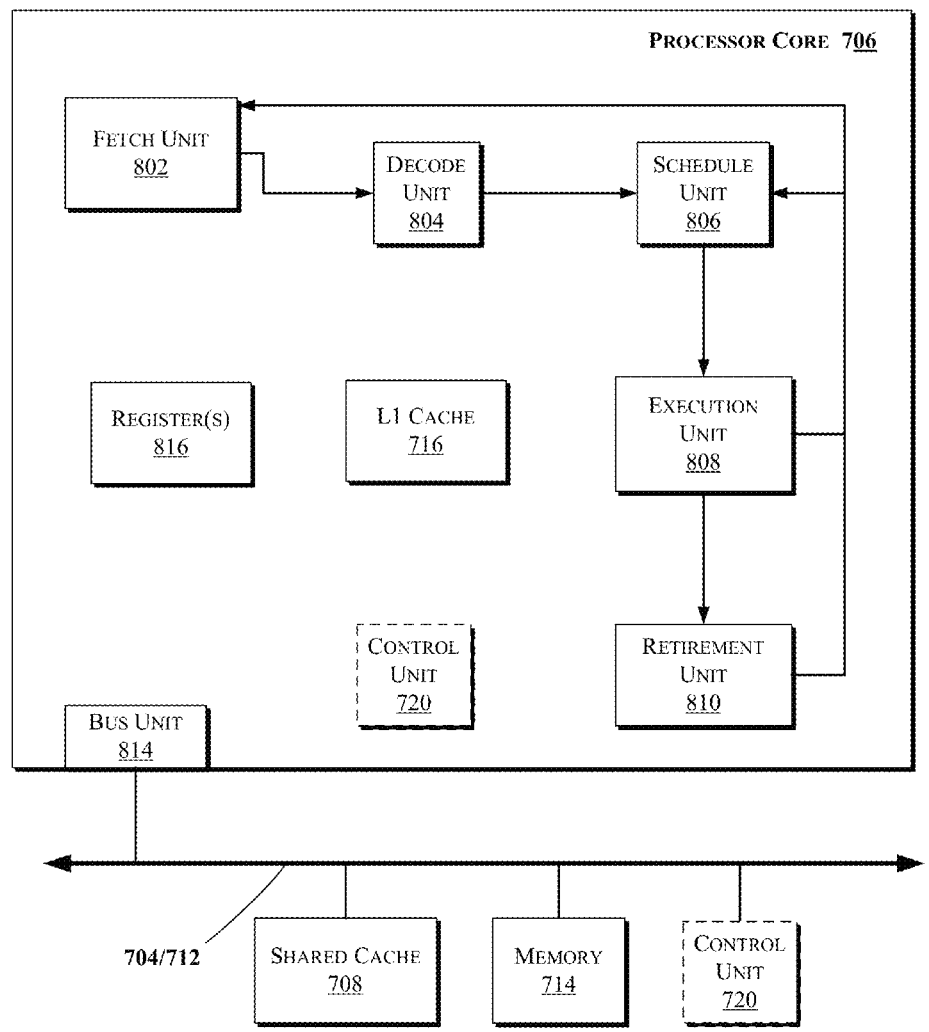

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
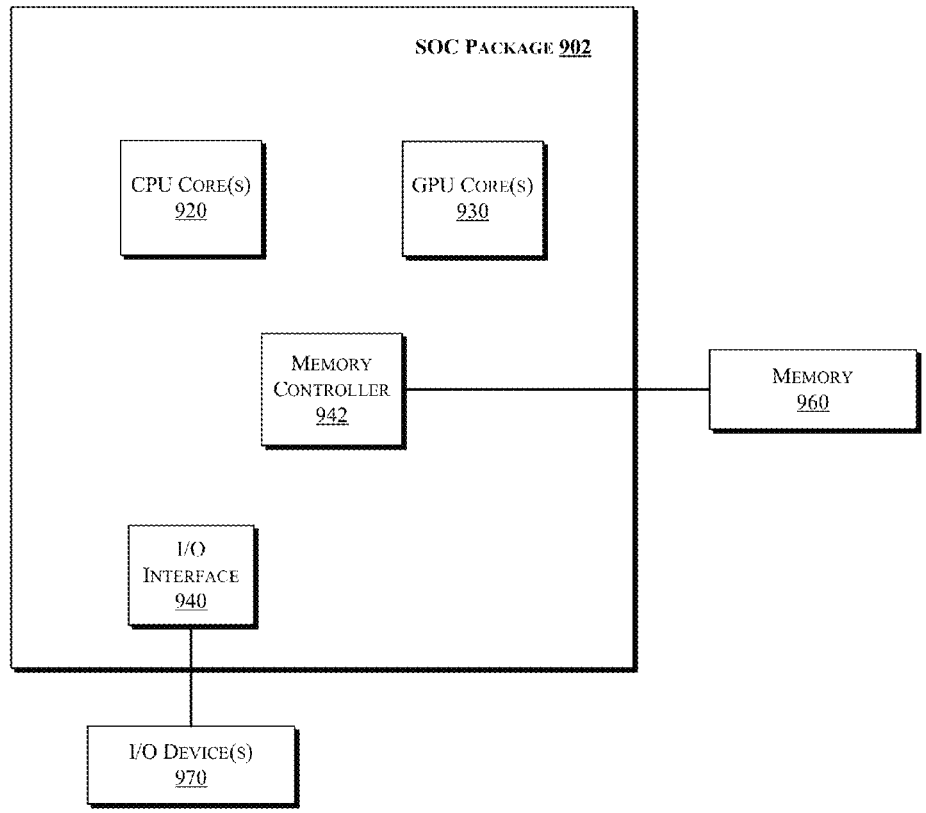

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Thus in some embodiments a locking mechanism 200 for a hinge 210, comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positioned proximate the housing 220 to change the MR fluid from a first state in which the MR fluid exhibits a low viscosity to a second state in which the MR exhibits a high viscosity.

The chamber 230 may comprise a first reservoir 232 and a second reservoir 234 connected by a constricted passageway 236. The locking mechanism 200 may comprise a compression spring 252 having a first seal 254 which defines the first end of the chamber 230. The locking mechanism piston 260 may comprise a threaded interior surface 262 which is to mate with a threaded exterior surface 214 of a helical screw 212 coupled to the hinge 210.

The magnet 290 comprises a permanent magnet coupled to the housing 210 and movable between a first position in which the magnet 290 is displaced from the chamber 230 to a second position in which the magnet 290 is proximate the chamber 230. The magnet 290 may comprise an electrically activated magnet positioned proximate the chamber 230, wherein the magnet 290 is to receive a signal initiated by a control module 176 to activate and to deactivate the magnet 290.

In some embodiments a chassis for an electronic device comprises a first section 160 and a second section 162, the second section coupled to the first section by a hinge 210 and a locking mechanism 200 for the hinge 210. The locking mechanism 200 comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positioned proximate the housing 220 to change the MR fluid from a first state in which the MR fluid exhibits a low viscosity to a second state in which the MR fluid exhibits a high viscosity.

The chamber 230 comprises a first reservoir 232 and a second reservoir 234 connected by a constricted passageway 236. The bias mechanism 250 comprises a compression spring 252 having a first seal 254 which defines the first end of the chamber 230. The piston 260 comprises a threaded interior surface 262 which is to mate with a threaded exterior surface 214 of a helical screw 212 coupled to the hinge 210.

The magnet 290 comprises a permanent magnet coupled to the housing 210 and movable between a first position in which the magnet 290 is displaced from the chamber 230 to a second position in which the magnet 290 is proximate the chamber 230. The magnet comprises an electrically activated magnet 290 positioned proximate the chamber 230, wherein the magnet 290 is to receive a signal initiated by a control module 176 to activate and to deactivate the magnet.

In another embodiment an electronic device comprises at least one electronic component 122, a housing comprising a first section 160 and a second section, the second section 162 coupled to the first section by a hinge 210, and a locking mechanism 200 for the hinge assembly. The locking mechanism 200 comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positioned proximate the housing 220 to change the MR fluid from a first state in which the MR fluid exhibits a low viscosity to a second state in which the MR exhibits a high viscosity.

The electronic device may comprise a first reservoir 232 and a second reservoir 234 connected by a constricted passageway 236. The bias mechanism 250 may comprise a compression spring 252 having a first seal 254 which defines the first end of the chamber 230. The piston 260 may comprise a threaded interior surface 262 which is to mate with a threaded exterior surface 214 of a helical screw 212 coupled to the hinge 210.

The magnet 290 may comprise a permanent magnet coupled to the housing 210 and movable between a first position in which the magnet 290 is displaced from the chamber 230 to a second position in which the magnet 290 is proximate the chamber 230. The magnet 290 may comprise an electrically activated magnet 290 positioned proximate the chamber, wherein the magnet is to receive a signal initiated by a remote controller to activate and to deactivate the magnet.

The electronic device may comprise logic to receive an input from a user interface, wherein the user input comprises an indicator to lock the hinge 210, and in response to the user input, to generate a lock signal. The electronic device may comprise logic to receive an input from a user interface, wherein the user input comprises an indicator to unlock the hinge 210 and in response to the user input, to generate an unlock signal. The unlock signal deactivates the magnet 290 to unlock the hinge assembly.

In some embodiments a method to operate a hinge 210 on an electronic device comprises receiving, in a controller on an electronic device 110, an input from a user interface, wherein the user input comprises an indicator to lock the hinge 210 and in response to the user input, transmitting a lock signal to an electrically activated magnet 290 positioned proximate a chamber 230 filled with magnetorheological (MR) fluid 240, wherein the lock signal activates the magnet 290 to change the MR fluid 230 from a first state in which the MR fluid 240 exhibits a low viscosity to a second state in which the MR exhibits a high viscosity.

The electronic device may comprising logic to receive an input from a user interface, wherein the user input comprises an indicator to unlock the hinge 210 and in response to the user input, transmitting an unlock signal to an electrically activated magnet 290 positioned proximate a chamber filled with a magnetorheological (MR) fluid 240, wherein the unlock signal deactivates the magnet 290 to change the MR fluid 240 from the second state in which the MR fluid 240 exhibits a high viscosity to the first state in which the MR fluid 240 exhibits a low viscosity.

The following examples pertain to further embodiments.

Example 1 is a locking mechanism 200 for a hinge 210, comprising a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positionable proximate the housing 220 to selectively apply a magnetic field to the MR fluid to change the MR fluid from a first state in which the MR fluid exhibits a low viscosity to a second state in which the MR exhibits a high viscosity.

In some embodiments the chamber 230 comprises a first reservoir 232 and a second reservoir 234 connected by a constricted passageway 236. In some embodiments the bias mechanism 250 comprises a compression spring 252 having a first seal 254 which defines the first end of the chamber 230. In some embodiments the piston 260 comprises a threaded interior surface 262 which is to mate with a threaded exterior surface 214 of a helical screw 212 coupled to the hinge 210.

In some embodiments the magnet 290 comprises a permanent magnet coupled to the housing 210 and movable between a first position in which the magnet 290 is displaced from the chamber 230 to a second position in which the magnet 290 is proximate the chamber 230. In some embodiments the magnet 290 comprises an electrically activated magnet positioned proximate the chamber 230, wherein the magnet 290 is to receive a signal initiated by a control module 176 to activate and to deactivate the magnet 290.

In example 2, a chassis for an electronic device, comprises a first section 160 and a second section 162, the second section coupled to the first section by a hinge 21 and a locking mechanism 200 for the hinge 210. The locking mechanism 200 comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positionable proximate the housing 220 to selectively apply a magnetic field to the MR fluid to change the MR fluid from a first state in which the MR fluid exhibits a low viscosity to a second state in which the MR exhibits a high viscosity.

In some embodiments the chamber 230 comprises a first reservoir 232 and a second reservoir 234 connected by a constricted passageway 236. In some embodiments the bias mechanism 250 comprises a compression spring 252 having a first seal 254 which defines the first end of the chamber 230. In some embodiments the piston 260 comprises a threaded interior surface 262 which is to mate with a threaded exterior surface 214 of a helical screw 212 coupled to the hinge 210.

In example 3, an electronic device comprises at least one electronic component 122, a housing comprising a first section 160 and a second section, the second section 162 coupled to the first section by a hinge 210, and a locking mechanism 200 for the hinge assembly. The locking mechanism 200 comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and a magnet 290 positionable proximate the housing 220 to selectively apply a magnetic field to the MR fluid to change the MR fluid from a first state in which the MR fluid exhibits a low viscosity to a second state in which the MR exhibits a high viscosity.

In some embodiments the chamber 230 comprises a first reservoir 232 and a second reservoir 234 connected by a constricted passageway 236. In some embodiments the bias mechanism 250 comprises a compression spring 252 having a first seal 254 which defines the first end of the chamber 230. In some embodiments the piston 260 comprises a threaded interior surface 262 which is to mate with a threaded exterior surface 214 of a helical screw 212 coupled to the hinge 210.

In example 4, a method to operate a hinge 210 on an electronic device, comprises receiving, in a controller on an electronic device 110, an input from a user interface, wherein the user input comprises an indicator to lock the hinge 210 and in response to the user input, transmitting a lock signal to an electrically activated magnet 290 positioned proximate a chamber 230 filled with a magnetorheological (MR) fluid 240, wherein the lock signal activates the magnet 290 to change the MR fluid 230 from a first state in which the MR fluid 240 exhibits a low viscosity to a second state in which the MR exhibits a high viscosity.

In some embodiments the method further comprises receiving an input from a user interface, wherein the user input comprises an indicator to unlock the hinge 210 and in response to the user input, transmitting an unlock signal to an electrically activated magnet 290 positioned proximate a chamber filled with a magnetorheological (MR) fluid 240, wherein the unlock signal deactivates the magnet 290 to change the MR fluid 240 from the second state in which the MR fluid 240 exhibits a high viscosity to the first state in which the MR fluid 240 exhibits a low viscosity.

In example 5, a locking mechanism 200 for a hinge 210, comprises a housing 220 defining a chamber 230 which is to contain a magnetorheological (MR) fluid 240, a bias mechanism 250 disposed at a first end of the chamber 230, a piston 260 disposed at a second end of the chamber 230, the piston 260 to be coupled to the hinge 210 rotatable about a first axis, wherein rotation of the hinge 280 about the first axis translates the piston 260 laterally in the housing on a first side of the chamber, and means for selectively applying a magnetic field to the MR fluid to change the MR fluid from a first state in which the MR fluid exhibits a low viscosity to a second state in which the MR exhibits a high viscosity.

In some embodiments the chamber 230 comprises a first reservoir 232 and a second reservoir 234 connected by a constricted passageway 236. In some embodiments the bias mechanism 250 comprises a compression spring 252 having a first seal 254 which defines the first end of the chamber 230. In some embodiments the piston 260 comprises a threaded interior surface 262 which is to mate with a threaded exterior surface 214 of a helical screw 212 coupled to the hinge 210.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A locking mechanism for a hinge, comprising:
    a housing defining a chamber which is to contain a magnetorheological (MR) fluid;
    a bias mechanism disposed at a first end of the chamber, wherein the bias mechanism comprises a compression spring having a first seal which defines the first end of the chamber;
    a piston disposed at a second end of the chamber, the piston to be coupled to the hinge rotatable about a first axis, wherein rotation of the hinge about the first axis translates the piston laterally in the housing on a first side of the chamber; and
    a magnet positionable proximate the housing to selectively apply a magnetic field to the MR fluid to change the MR fluid from a first state in which the MR fluid exhibits a low viscosity to a second state in which the MR exhibits a high viscosity.

2. The locking mechanism of claim 1, wherein the chamber comprises a first reservoir and a second reservoir connected by a constricted passageway.

3. The locking mechanism of claim 1, wherein the piston comprises a threaded interior surface which is to mate with a threaded exterior surface of a helical screw coupled to the hinge.

4. The locking mechanism of claim 1, wherein the magnet comprises a permanent magnet coupled to the housing and movable between a first position in which the magnet is displaced from the chamber to a second position in which the magnet is proximate the chamber.

5. The locking mechanism of claim 1, wherein the magnet comprises an electrically activated magnet positioned proximate the chamber, wherein the magnet is to receive a signal initiated by a control module to activate and to deactivate the magnet.

6. A chassis for an electronic device, comprising:
    a first section and a second section, the second section coupled to the first section by a hinge; and
    a locking mechanism for the hinge, the locking mechanism comprising:
        a housing defining a chamber which is to contain a magnetorheological (MR) fluid;
        a bias mechanism disposed at a first end of the chamber, wherein the bias mechanism comprises a compression spring having a first seal which defines the first end of the chamber;
    a piston disposed at a second end of the chamber, the piston to be coupled to the hinge rotatable about a first axis, wherein rotation of the hinge about the first axis translates the piston laterally in the housing on a first side of the chamber; and
    a magnet positionable proximate the housing to selectively apply a magnetic field to the MR fluid to change the MR fluid from a first state in which the MR fluid exhibits a low viscosity to a second state in which the MR exhibits a high viscosity.

7. The housing of claim 6, wherein the chamber comprises a first reservoir and a second reservoir connected by a constricted passageway.

8. The housing of claim 6, wherein the piston comprises a threaded interior surface which is to mate with a threaded exterior surface of a helical screw coupled to the hinge.

9. The housing of claim 6, wherein the magnet comprises a permanent magnet coupled to the housing and movable between a first position in which the magnet is displaced from the chamber to a second position in which the magnet is proximate the chamber.

10. The housing of claim 6, wherein the magnet comprises an electrically activated magnet positioned proximate the chamber, wherein the magnet is to receive a signal initiated by a control module to activate and to deactivate the magnet.

11. An electronic device, comprising:
    at least one electronic component; and
    a housing comprising a first section and a second section, the second section coupled to the first section by a hinge; and
    a locking mechanism for the hinge assembly, the locking mechanism comprising:
        a housing defining a chamber which is to contain a magnetorheological (MR) fluid;
        a bias mechanism disposed at a first end of the chamber, wherein the bias mechanism comprises a compression spring having a first seal which defines the first end of the chamber;
    a piston disposed at a second end of the chamber, the piston to be coupled to the hinge rotatable about a first axis, wherein rotation of the hinge about the first axis translates the piston laterally in the housing on a first side of the chamber; and
    a magnet positionable proximate the housing to selectively apply a magnetic field to the MR fluid to change the MR fluid from a first state in which the MR fluid exhibits a low viscosity to a second state in which the MR exhibits a high viscosity.

12. The electronic device of claim 11, wherein the chamber comprises a first reservoir and a second reservoir connected by a constricted passageway.

13. The electronic device of claim 11, wherein the piston comprises a threaded interior surface which is to mate with a threaded exterior surface of a helical screw coupled to the hinge.

14. The electronic device of claim 11, wherein the magnet comprises a permanent magnet coupled to the housing and movable between a first position in which the magnet is displaced from the chamber to a second position in which the magnet is proximate the chamber.

15. The electronic device of claim 11, wherein the magnet comprises an electrically activated magnet positioned proximate the chamber, wherein the magnet is to receive a signal initiated by a remote controller to activate and to deactivate the magnet.

16. The electronic device of claim 15, further comprising logic to:
    receive an input from a user interface, wherein the user input comprises an indicator to lock the hinge; and
    in response to the user input, to generate a lock signal.

17. The electronic device of claim 15, further comprising logic to:
    receive an input from a user interface, wherein the user input comprises an indicator to unlock the hinge; and
    in response to the user input, to generate an unlock signal.

18. The electronic device of claim 17, wherein the unlock signal deactivates the magnet to unlock the hinge assembly.

* * * * *